Figure 1:
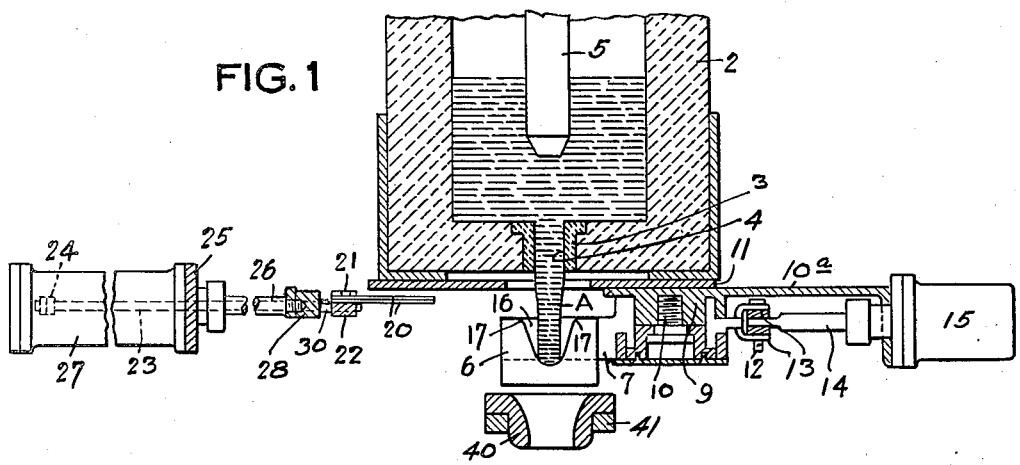

Sept. 8, 1925.

O. C. NOBLE 1,552,497

METHOD AND APPARATUS FOR FEEDING GLASS

Filed Oct. 13, 1921    2 Sheets-Sheet 1

INVENTOR
Olbert C Noble,
By Kay, Totten Brown,
Attorneys

Sept 8, 1925.

O. C. NOBLE

METHOD AND APPARATUS FOR FEEDING GLASS

Filed Oct. 13, 1921

2 Sheets-Sheet 2

1,552,497

INVENTOR

Patented Sept. 8, 1925.

1,552,497

UNITED STATES PATENT OFFICE.

OLBERT C. NOBLE, OF GRAFTON, WEST VIRGINIA, ASSIGNOR TO TYGART VALLEY GLASS CO., OF GRAFTON, WEST VIRGINIA, A CORPORATION OF WEST VIRGINIA.

METHOD AND APPARATUS FOR FEEDING GLASS.

Application filed October 13, 1921. Serial No. 507,560.

*To all whom it may concern:*

Be it known that I, OLBERT C. NOBLE, a citizen of the United States, and resident of Grafton, in the county of Taylor and State of West Virginia, have invented a new and useful Improvement in Methods and Apparatus for Feeding Glass; and I do hereby declare the following to be a full, clear, and exact description thereof.

My invention relates to the separation of molten glass into individual mold charges, and particularly to that class of glass-feeding methods known as stream feeds, where a stream of glass is caused to issue continuously from an outlet and is divided up into sections, each section forming the charge for one mold.

One object of my invention is to improve the stream-feeding method by preventing the glass from lapping and from causing blisters in the finished ware.

Another object of my invention is to provide an improved method of reheating the sheared end of each gather or gob by incorporating it in the hot glass which forms the body of the gather, thereby eliminating shear marks from the finished ware.

A further object of my invention is to provide improved apparatus for carrying out the above-indicated method of stream feeding.

The art of dividing a flowing stream of glass into mold charges has existed for many years. It has been proposed to cut the stream into sections by means of shears, permitting the flowing stream to pile up on the shears in the interval during which the severed gather or gob is received in a mold and while the molds are being changed. It has also been proposed to make use of cups of various kinds into which the flowing stream is allowed to flow until the necessary quantity has accumulated, after which the flowing stream is severed and the cup is emptied into a mold. Sometimes the mold is directly below the accumulating cup, and sometimes the mold is located at one side, so that it is necessary to move the cup laterally before being emptied.

My present invention resembles some of the previous stream feeding methods in that it makes use of an accumulating cup which is alternately filled and emptied. The novel features of my method and apparatus consist, first, in a particular arrangement of the cup and the shears with respect to the outlet orifice; and second, in a particular relation between the shape of the accumulating cup and the shape of the mold, whereby the accumulating cup gives the gather a shape conforming approximately to the shape of the mold, but differing from the shape of the mold sufficiently to cause the glass, when delivered into the mold, to enfold the sheared stub of glass and thoroughly reheat the portions chilled by the shears. The first of these novel features eliminates laps and blisters from the finished product, and the second of these features eliminates shear marks from the product.

In prior stream-feeding methods, and in the related methods of gob-feeding, it has usually been thought desirable to produce an attenuated or necked-in section in the flowing glass, and to sever the mold charge at the attenuated or necked-in portion in order that the shears may be in contact with as small a cross section of the glass is possible, and consequently will produce a chilled shear mark that is small and therefore easy to reheat and incorporate in the body of the glass. I have found in the operation of my present method that the best results as to the elimination of shear marks is produced, not by attenuating and cutting the glass at the point of attenuation, but by cutting the stream at its thickest practicable point. While the shear mark is larger when a thick stream is cut than when a thin stream is cut, this disadvantage is more than offset by the increased volume of glass immediately adjacent to the cutting point, and by the further advantage that the glass, when severed close to the outlet at a thick portion, can be received in a cup which is also close to the orifice and which therefore receives the glass before it has attained any great falling velocity. I therefore place both the shears and the cup as close to the outlet orifice as is practicable.

By placing the gathering cup relatively close to the outlet from which the stream of glass issues, two principal advantages are produced. First, the glass is received in the cup in a thick stream because it has not had time to attenuate to any material extent and this stream may be almost as large as the inside diameter of the cup, so that there is no tendency for the stream of glass to coil in the cup and produce laps and blisters, but on the contrary the glass, after it enters the cup, merely swells to fill the cup, the additional glass being received in the interior of the body of glass which first enters the cup and the original outside of the stream being thereby expanded against the walls of the cup without overlapping.

The second advantage which results from placing the cup close to the outlet orifice is that the glass is received in the cup before it acquires any great velocity, and therefore the glass is not forced against the sides of the cup so strongly as to cause any substantial adhesion. In most of the prior glass-feeding methods where gathering cups have been employed, these cups have ben placed so far below the outlet orifice that the glass falls into the cup with considerable force, which greatly increases the adhesion of the glass to the walls of the cup and interferes with the proper discharge of the glass from the cup into the mold.

As stated, the location of the cup and shears close beneath the orifice tends to prevent the formation of laps and blisters which is one of the two main objects of my invention. My second main object is to eliminate shear marks from the ware, and this is accomplished both by cutting the thick portion of the stream and by the shaping effect of the gathering cup. Most blank molds and press molds have openings that taper downwardly, being larger at the top than at the bottom. My gathering cup also tapers downwardly so that the shape of the gather accumulated in the cup conforms in a general way to the shape of the mold in which the gather is received. However, this conformity is not exact, the sides of the cup being made to converge downwardly at an angle wider than the angle between the sides of the opening in the mold. The result of this relation between the cup and the mold is that when the gather discharged from the cup is received in the mold, the sides or shoulders of the gather strike the mold before the leading end of the gather reaches the bottom of the mold cavity. The result of this action is that the side portions or shoulders of the gather are retarded and folded over the center of the gather, thus enveloping the sheared stub and effectively incorporating the sheared scar in the hot body of the gather.

The shaping of the gather into approximate conformity to the shape of the mold has the further advantage that the gather is not lapped or coiled when dropped into the mold, which is an additional means for preventing blisters and laps in the finished ware.

In order to insure that the gather shall be properly dropped into the mold, I provide a dropping-in ring or funnel between the cup and the mold. This ring or funnel is useful because in severing the glass the shears have more or less tendency to push the gather to one side and this effect varies from time to time. Also, when a partible gathering cup is employed, the glass may adhere somewhat to one of the sections of the cup, and may be dragged slightly to one side or the other. The dropping-in ring or funnel corrects any such lateral displacement of the gather, and insures that it will fall into the mold properly.

Figure 6:
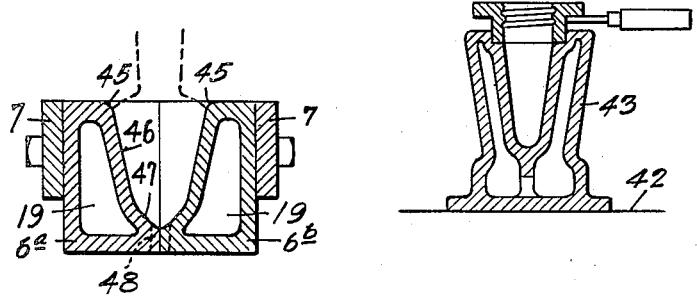
Figure 2:
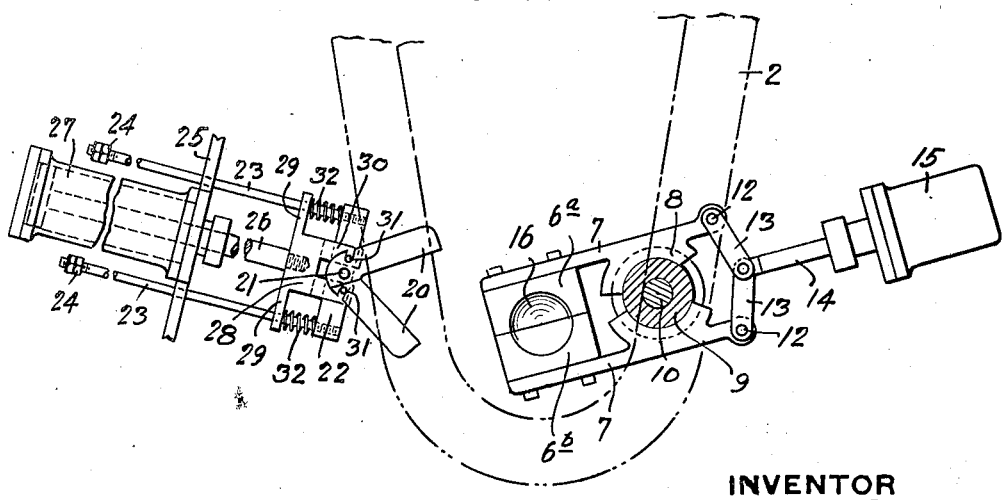
Figure 3:
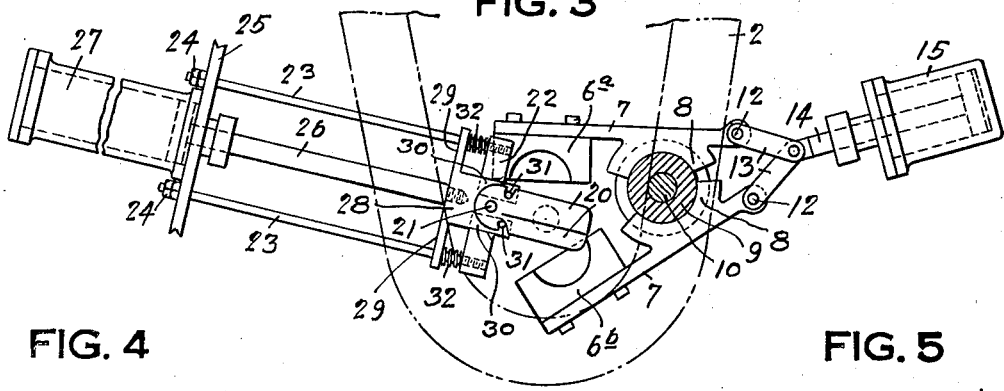
Figure 4:
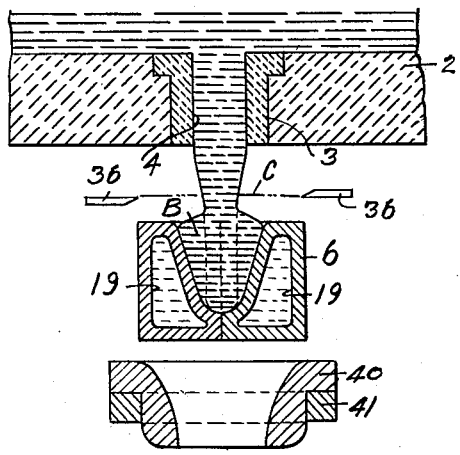
Figure 5:
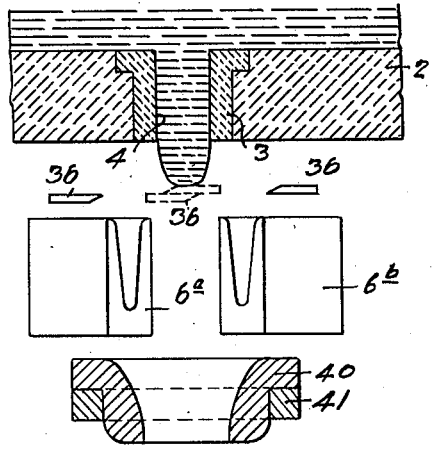
Figure 5:
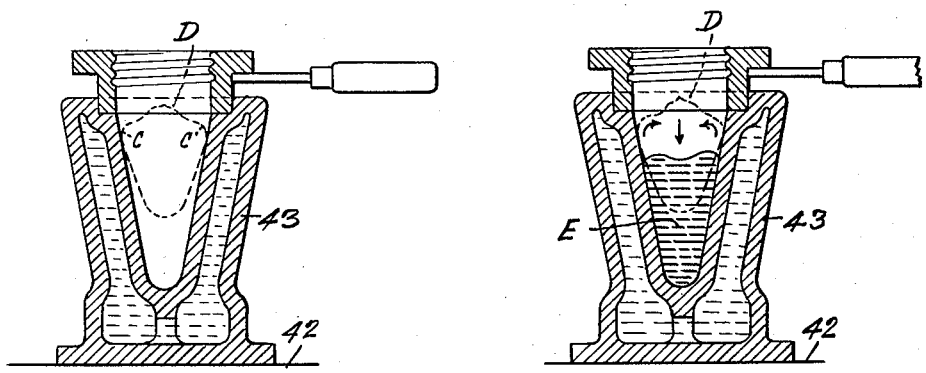

The accompanying drawing shows one form of apparatus which I have found to be very satisfactory in carrying out the method described above. Fig. 1 is a vertical sectional view showing the general arrangement of my improved feeding apparatus; Fig. 2 is a plan view of the cup and the shears with their supports and operating mechanisms, showing the cup closed and the shears open; Fig. 3 is a plan view of the same mechanism shown in Fig. 2 with the cup open and the shears in their closed or cutting position; Fig. 4 is a diagrammatic vertical sectional view showing the gathering cup filled with a charge of glass and the mold in position to receive the charge; Fig. 5 is a diagrammatic view similar to Fig. 4 showing the condition of the apparatus after the charge has been cut off and received in the mold; and Fig. 6 is a vertical sectional view taken centrally through a gathering cup which may be used to carry out my process.

In the drawing, the numeral 2 designates a container for molten glass which may be the snout or forehearth of a tank furnace but may also be any other suitable container for molten glass. A bushing 13 is set in the bottom of the container 2 and forms an outlet 4 for the molten glass which flows through the outlet at a rate which is regulated by means of a valve 5 adjustably located above the outlet opening 4. The valve meber 5 is not reciprocated periodically, as in plunger feeders of the gob-feeding type, but remains stationary except when it is desired to increase or decease the flow of glass, when the valve is raised or lowered by any suitable adjusting mechanism, which is not shown on the drawing as this mechanism may be of the kind that is commonly employed for raising and lowering plungers in glass feeding apparatus.

Directly below the discharge opening 4, and as near to the discharge opening as it can be placed, while leaving room for the operation of the shears, is a partible cup 6 composed of similar halves 6ª and 6ᵇ which are supported on arms 7 having projections 8 which are circularly curved and are received in a stationary circular guide 9 secured by a screw 10 to a support 10ª which depends from a plate 11 on the under side of the glass container 2. The rear ends of the arm 7 are loosely pivoted at 12 to toggle links 13 which are both pivoted to the end of the piston rod 14 of a pneumatic or hydraulic cylinder 15. The particular means here shown for pivoting the cup sections 6ª and 6ᵇ form no specific part of my invention, and various other constructions may be employed for causing the cup sections to open and close.

When the cup mechanism is in the position shown in Fig. 2 the halves of the cup are closed to form a recess 16 which may have the forms shown in Figs. 1, 4, 5 and 6, the lower end of this recess being rounded or pointed and the sides flaring upwardly and terminating in rounded shoulders 17. The sections of the cup may be made hollow, as shown at 19, Fig. 4, to provide for the circulation of water or other cooling fluid. When the piston rod 14 is drawn into the cylinder 15 it operates through the toggle links 13 to move the cup sections into the open position shown in Fig. 3.

A pair of shears are arranged to advance at proper intervals to cut off the stream of glass above the cup 6. These shears may be of any desired construction. As shown, they consist of two shear blades 20, both of which are pivotally mounted on a pin 21 carried by a bar 22. Guide rods 23 are secured at their forward ends to the bar 22 and are provided at their threaded rear ends with adjustable nuts 24 which are adapted to engage a fixed support 25 to limit the forward movement of the bar 22 and therefore of the shears 20. The piston rod 26 of a hydraulic or pneumatic cylinder 27 carries at its forward end a cross head 28 having lateral arms 29 through which the guide rods 23 extend loosely, and also having forward projections 30 which slide in transverse slots formed in the bar 22. The projections 30 extend past the pivot pin 21 and carry pins 31 that engage slots in the knife blades 20. Springs 32 surround the rods 23 between the bar 22 and the arms 29 of the cross-head. When the cylinder 27 is operated to advance the piston rod 26, the shear mechanism moves forward as a whole until the nuts 24 strike the fixed support 25. This stops the bar 22 and the shears 20, but the piston rod advances a short distance farther, carrying with it the cross-head 28, and the shear-operating pins 31, which are carried by the cross-head, cause the shear- blades to close and cut off the stream of glass. When the piston is reversed, the springs 32 cause the shears to remain stationary while the cross-head begins its reverse movement, and the pins 31 therefore operate to open the shears, after which the whole shear mechanism returns to its starting position.

The construction of the shears which I have just described forms no part of my present invention, and any customary or desired type of shears may be employed in carrying out my process. Thus on Figs. 4 and 5 I have shown diagrammatically a common form of shears indicated by the numeral 36 in which the shear blades approach each other from opposite sides of the stream of glass instead of advancing together and closing after the manner of scissors, as in the form of shears specifically described above.

Below the cup 6 is a guide ring or funnel 40 which preferably has the flaring internal form shown on Figs. 1, 4 and 5, and is of considerable depth, say three or four inches. This ring is mounted on a stationary support 41 and is not moved during the operation of the machine.

Below the guide ring 40 is a mold table 42, which is shown diagrammatically on the drawing and may be of any usual or desired type, carrying a series of molds, one of which is shown at 43. The specific mold construction forms no part of my invention, and the mold is shown on the drawing only for the purpose of illustrating the action of the feeding device.

Fig. 6 shows in some detail a particular form of cup which I have found very useful in connection with the apparatus described above. This cup, like the cups shown in the other figures of the drawing, consists of two similar halves 6ª and 6ᵇ carried on supports 7 and containing passages 19 for the circulation of cooling fluid. The peculiarity of this cup is that its glass-containing cavity below the upper rounded edges 45 is composed of two surfaces 46 and 47, both of which converge conically, the angle of the conical surface 46 being greater than the angle of convergence of the mold, and the surface 47 converging at a still greater angle. The advantage of this cup-form is that the lower end of the gather which it produces is quickly and completely released when the cup opens, because all parts of the lower surfaces 37 are inclined downwardly and so present but little resistance to the glass. When the bottom of a partible gathering cup is circularly curved or flat, the bottom surfaces drag across the bottom of the gather when the cup is open and tend to distort the gather or move it out of its correct line of fall. If desired, an opening indicated in dotted lines at 48, Fig. 6, may be formed in the cup to prevent the pointed lower end of the gather from coming in contact with the metal of the cup, and for thereby keeping the point of the gather hot and preventing chill marks in the bottom of the finished ware.

In the operation of the apparatus described above, the glass flows through the discharge opening in a stream, as shown at A on Fig. 1. This stream necessarily begins to thin somewhat as soon as it issues from the discharge opening. If, for example, the discharge opening is 1½ inches in diameter it may decrease to a diameter of about ¾ of an inch at the level of the top of the cup 6. The diameter of the top of the cup opening in that case may be about 2 inches. The stream A falls into the opening 16 of the cup in approximately the form shown in Fig. 1, and as the flow continues the portion of glass which enters the cup is expanded to fill the cup, either completely or partially, according to the weight of the ware to be made, the extent to which the cup is filled being regulated by the timing of the cup-opening mechanism and the shears. When the cup is filled completely, the glass presents approximately the appearance shown at B, Fig. 4. On account of the position of the cup close beneath the outlet orifice, and on account of the proportions of the cup with respect to the size of the stream, the stream does not coil or lap in the cup, but is expanded by the descending glass, thereby avoiding laps and blisters which would remain in the finished ware.

This accumulation of glass in the cup 6 takes place very quickly, and the shears 20 are so timed that they advance and cut off the stream as soon as the cup is filled to the desired extent. The approximate line on which the shears operate is indicated at C, Fig. 4. It is necessary that the shears be spaced somewhat below the discharge outlet in order to prevent the smearing and riveting of glass which takes place when the glass is sheared at the outlet, but the effort is to have the shears as close to the outlet as is practicable in order that the stream of glass may be as thick as possible at the point where it is cut.

Substantially the same moment that the glass is cut by the shears the cup sections are separated, thereby releasing the severed gather and permitting it to drop through the guide ring 40 into the mold 43. In some cases the gather will not touch the guide ring 40 at all, but if the shears have operated to push the tail of the gather to one side, as sometimes happens, or if the glass adheres slightly to one side of the partible cup, the gather may be deflected slightly and will strike the ring 40 momentarily as it descends. When the glass is cut by the shears a stub or tail of glass remains attached to the gather B above the cup. This stub may remain more or less erect, or may lap over somewhat as the gather is falling toward the mold.

At this point an important feature of my invention comes into play. The upper sides of the shoulders C of the gather are the first portions of the gather to strike the sides of the mold, the momentary condition at this time being shown in dotted lines on Fig. 4. The lower part of the gather continues to fall and draw down until it rests in the bottom of the mold, and during this downward movement the sides of the shoulders C of the gather, being checked in their fall by contact with the sides of the mold, are raised and folded over with respect to the central severed portion D of the gather, the movement of the glass being indicated by the small arrows on Fig. 5. This brings the gather when it finally comes to rest in the mold into the approximate shape shown at E, Fig. 5, the shear scar having been completely enveloped in the hot glass folded over it from the thick hot portions of the gather.

As soon as the gather comes to rest in the mold, the mold is removed and a fresh mold placed in position. Meanwhile, the shears have returned to their starting position and the cup sections have closed. The shears operate so quickly that they do not have any appreciable piling-up effect on the lower end of the stream of glass, and the opening and closing of the cup sections are so timed that they are closed in time to receive the lower end of the next gather.

Some of the important conditions for successful operation of my method are, first, that the glass shall be cut off at a hot portion, that is to say, at a point where it is as thick as practicable; second, that the glass be caught in a cup that tapers in approximate conformity with the taper of the mold but at a wider angle; third, that a dropping-in ring or funnel be provided to correct any tendency of the gather to lap over; fourth, that the tail of the gather be enveloped in the hot side portions of the glass, which side portions or shoulders are never chilled because of their relative thickness; and, fifth, that the glass be delivered into the gathering cup at as low velocity as practicable so as to eliminate the tendency of the glass to adhere to the sides of the cup.

Two important commercial advantages result from the above-described method. First, the finished ware contains no blisters, this advantage resulting from the fact that the glass is cut in a thick, hot stream close to the orifice, and from the further fact that the gathering cup is also close to the orifice; and second, the finished ware contains no shear mark, which results from the fact that the shear scar is enfolded in a thick mass of hot glass at the time when the gather enters the mold.

At present I prefer to make use of a divided cup in carrying out my process. It is not necessary, however, that such a cup be employed, as a solid cup may be used to accumulate and shape the gather and may then be moved quickly downward and laterally to clear the path of the descending glass, thereby producing the same effects described above. Various other changes in the form and arrangement of parts may readily be made without departing from my invention, and I therefore wish it to be understood that the apparatus here shown is intended for illustration only, and that my invention is not limited except by the scope of the appended claims.

I claim as my invention:

1. The method that comprises causing a stream of molten glass to flow vertically toward a mold having a downwardly converging glass-receiving cavity, intercepting the end of the said stream in a gathering cup having a cavity converging downwardly at an angle greater than the angle of convergence of the said mold cavity, accumulating a shaped gather of glass in the said gathering cup, severing the said stream at an unattenuated portion thereof above the said cup, and releasing the said gather from the said cup and permitting the said gather to fall vertically into the said mold cavity.

2. The method that comprises dropping a shaped gather of glass having a sheared upper end into a mold cavity, and causing the upper sides of the said gather to enfold the said sheared portion of the said gather.

3. The method that comprises dropping a shaped gather of molten glass having downwardly converging sides and having a sheared portion at its upper end into a mold cavity having sides converging downwardly more steeply than the convergence of the said gather, whereby the upper sides or shoulders of the said gather are caused to enfold the said sheared portion of the said gather when the said gather is received in the said mold cavity.

4. The method that comprises causing a stream of molten glass to flow continuously from a discharge outlet, periodically severing the said stream by mechanical shears relatively close to the said outlet, periodically intercepting the end of said stream after severing and before the said stream has attained material falling velocity, accumulating each successive stream section into a gather having downwardly converging sides, releasing the said gather substantially simultaneously with the next severing operation, and receiving each successive gather in a mold disposed vertically beneath the said outlet and having a glass-receiving cavity, the sides of which converge downwardly more steeply than the sides of said gather, whereby the upper sides or shoulders of each gather are caused to enfold the sheared portion of said gather.

5. The method that comprises periodically subdividing a continuously flowing stream of molten glass into mold charges, imparting to the successive charges a downwardly converging shape, and receiving the successive charges in molds having glass-receiving cavities that taper downwardly more steeply than the taper of the said gathers.

6. The method that comprises causing a stream of molten glass to flow continuously from a discharge outlet, periodically shearing the said stream by means of mechanical shears at a thick portion thereof relatively close to the said outlet, intercepting each successive end of the said stream in a gathering cup, accumulating in the said cup a mold charge of glass having downwardly converging sides, releasing each successive gather at substantially the same time as the next shearing operation, permitting the successive gathers to fall into molds disposed vertically beneath the said outlet and having glass-receiving cavities tapering downwardly more steeply than the taper of said gathers, and providing means between the said gathering cup and the said mold position for correcting any deflection of the said gathers.

7. Apparatus for feeding molten glass comprising a container for glass having a discharge outlet, mechanical shears adapted to operate relatively close beneath the said outlet so as to sever a thick portion of the flowing stream, a gathering cup close beneath the shearing position, and means for presenting molds in succession beneath the said outlet and below the said cup, the said molds having downwardly tapering glass-receiving cavities, and the said gathering cup having a glass-receiving cavity that also tapers downwardly, but at a wider angle than the angle of taper of the said molds.

8. Apparatus for feeding molten glass comprising a container for glass having a discharge outlet, mechanical shears adapted to operate relatively close beneath the said outlet so as to sever a thick portion of the flowing stream, a gathering cup close beneath the shearing position, means for presenting molds in succession beneath the said outlet and below the said cup, and a stationary guide ring or funnel interposed between the said gathering cup and the said mold position, the said gathering ring or funnel having substantially the same diameter as the upper diameter of the said mold cavities.

9. A gathering cup for use in accumulating mold charges of molten glass having a glass-receiving cavity, the sides of which converge downwardly and the bottom of which is conical and converges at an angle wider than the angle of convergence of the said sides.

10. A gathering cup for use in accumulating mold charges of molten glass having a glass-receiving cavity, the bottom of which is pointed and the sides of which are composed of two conical sections of different angles of convergence.

In testimony whereof I, the said OLBERT C. NOBLE, have hereunto set my hand.

OLBERT C. NOBLE.